US012615338B2

(12) United States Patent
Le

(10) Patent No.: US 12,615,338 B2
(45) Date of Patent: Apr. 28, 2026

(54) OPERATION DEVICE IN WHICH SPECIAL INPUT PORTION CAN BE COVERED UP DURING NORMAL USE, AND IMAGE FORMING APPARATUS

(71) Applicant: KYOCERA Document Solutions Inc., Osaka (JP)

(72) Inventor: Mai Thi Le, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 236 days.

(21) Appl. No.: 18/636,085

(22) Filed: Apr. 15, 2024

(65) Prior Publication Data

US 2024/0348732 A1      Oct. 17, 2024

(30) Foreign Application Priority Data

Apr. 17, 2023      (JP) ................................. 2023-067039

(51) Int. Cl.
*H04N 1/00*            (2006.01)

(52) U.S. Cl.
CPC . *H04N 1/00496* (2013.01); *H04N 2201/0094* (2013.01)

(58) Field of Classification Search
CPC ....... H04N 1/00496; H04N 2201/0094; H04N 1/00352

USPC .......................................................... 358/296
See application file for complete search history.

(56) References Cited

U.S. PATENT DOCUMENTS

2009/0103251 A1      4/2009   Suzuki et al.

FOREIGN PATENT DOCUMENTS

| CN | 109263313 | B | * | 9/2020 | .............. B41J 29/06 |
| JP | 2007155864 | A | * | 6/2007 | |
| JP | 2009105557 | A | | 5/2009 | |

* cited by examiner

*Primary Examiner* — Charlotte M Baker
(74) *Attorney, Agent, or Firm* — Alleman Hall LLP

(57)            ABSTRACT

An operation device operated by a person includes an operation portion, an attachment portion, and an opening/closing portion. The operation portion includes a normal input portion on a front surface thereof and a special input portion on a back surface or side surface thereof. The attachment portion supports the operation portion such that an angle of the operation portion can be changed between a tilted angle at which the operation portion is set in a tilted attitude and an erected angle at which the operation portion is set in an erected attitude. The opening/closing portion covers up the special input portion when the operation portion is set at the tilted angle and exposes the special input portion when the operation portion is set at the erected angle.

5 Claims, 18 Drawing Sheets

OPERATION DEVICE IN WHICH SPECIAL INPUT PORTION CAN BE COVERED UP DURING NORMAL USE, AND IMAGE FORMING APPARATUS

INCORPORATION BY REFERENCE

This application is based upon and claims the benefit of priority from the corresponding Japanese Patent Application No. 2023-067039 filed on Apr. 17, 2023, the entire contents of which are incorporated herein by reference.

BACKGROUND

The present disclosure relates to an operation device and an image forming apparatus.

An electronic device such as an image forming apparatus is provided with an operation device which is operated by a user. For example, the operation device includes a touch panel body rotatably provided in a main body and a tilt mechanism which maintains the touch panel body at a desired rotation angle. An attitude of the touch panel body is changed between a first attitude in which the touch panel body is lodged with respect to the main body and a second attitude in which the touch panel body is erected with respect to the main body.

SUMMARY

The present disclosure is an operation device operated by a person, including an operation portion, an attachment portion, and an opening/closing portion. The operation portion includes a normal input portion on a front surface thereof and a special input portion on a back surface or side surface thereof. The attachment portion supports the operation portion such that an angle of the operation portion can be changed between a tilted angle at which the operation portion is set in a tilted attitude and an erected angle at which the operation portion is set in an erected attitude. The opening/closing portion covers up the special input portion when the operation portion is set at the tilted angle and exposes the special input portion when the operation portion is set at the erected angle.

This Summary is provided to introduce a selection of concepts in a simplified form that are further described below in the Detailed Description with reference where appropriate to the accompanying drawings. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Figure 1:
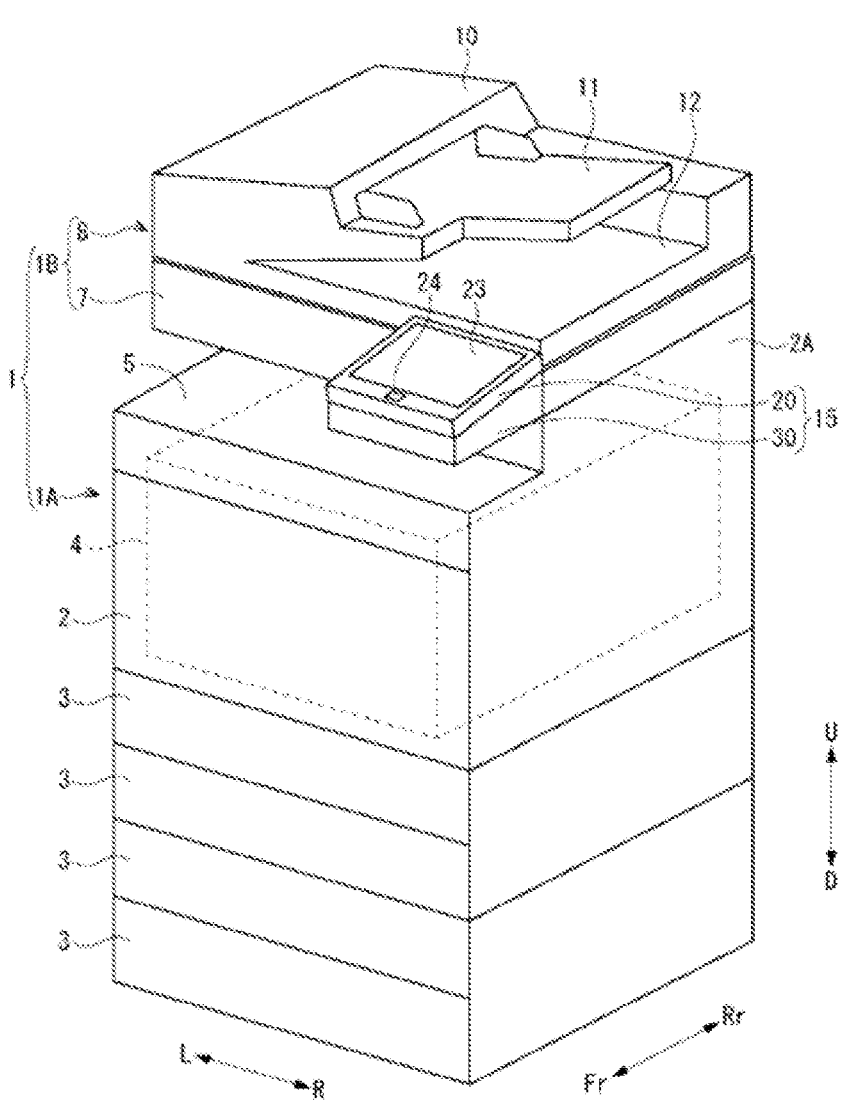
FIG. 1 is a perspective view showing an image forming apparatus according to an embodiment of the present disclosure.

Hereinafter, an embodiment of the present disclosure will be described with reference to the attached drawings. It is noted that Fr, Rr, L, R, U, and D shown in the drawings indicate front, rear, left, right, up, and down, respectively. Although terms indicating directions and positions are used in the present specification, those terms are used for convenience of descriptions and do not limit the technical scope of the present disclosure.

Image Forming Apparatus

An image forming apparatus 1 will be described with reference to FIG. 1. FIG. 1 is a perspective view showing the image forming apparatus 1. The image forming apparatus 1 is a so-called multifunction peripheral and includes an imaging device 1A and an image reading device 1B.

Imaging Device

The imaging device 1A includes a device body 2 configuring an external appearance having substantially a rectangular parallelepiped shape. A plurality of (for example, four) sheet feed cassettes 3 that each store a paper sheet (not shown) as an example of a sheet are detachably provided below the device body 2. An imaging portion 4 which forms an image on a paper sheet using electrophotography is provided inside the device body 2 (above the uppermost sheet feed cassette 3). In addition, a sheet discharge tray 5 on which a paper sheet formed (printed) with an image is discharged is provided on an upper surface of the device body 2. It is noted that although illustrations will be omitted, the imaging portion 4 includes configurations requisite for forming an image on a paper sheet using electrophotography, such as a toner container, a photoconductor drum, a charging device, a developing device, a transfer roller, a laser scanning unit, and a fixing device. Moreover, the imaging portion 4 may form a full-color image or form a monochrome image.

A coupling support portion 2A which supports the image reading device 1B is provided at an upper portion of the device body 2. When seen in a plane, the coupling support portion 2A is formed substantially in an L shape so as to surround the rear side and right side of the sheet discharge tray 5. It is noted that the coupling support portion 2A is a part of the device body 2 and is formed integrally with the device body 2. In addition, the device body 2 including the coupling support portion 2A includes a metallic frame and a member formed of a synthetic resin, that is fixed to this frame.

Image Reading Device

As shown in FIG. 1, the image reading device 1B includes a reading unit 7 and a conveying unit 8. The reading unit 7 has a function of reading an image of a document sheet (not shown), and the conveying unit 8 has a function of conveying a document sheet to a reading position to be read by the reading unit 7.

Reading Unit

The reading unit 7 is attached at an upper portion of the coupling support portion 2A and is arranged at a position apart from the sheet discharge tray 5 in an upward direction. A space is configured between the sheet discharge tray 5 and the reading unit 7 so that a plurality of paper sheets can be stacked therein. An optical system device (not shown) which reads an image on a set document sheet is incorporated in a housing of the reading unit 7. In addition, an operation device 15 which is operated by a person (a user, a maintenance worker, or the like) is provided at a front right portion of the reading unit 7.

Conveying Unit

The conveying unit 8 is arranged on an upper surface of the reading unit 7 and is supported while being openable and closable via a hinge (not shown) provided on an upper surface of a rear portion of the reading unit 7. The conveying unit 8 includes a conveying mechanism portion 10, a document sheet supply tray 11, and a document sheet discharge tray 12. The conveying mechanism portion 10 is arranged at substantially the left half of the upper surface of the reading unit 7, the document sheet supply tray 11 extends in a rightward direction from an upper right end portion of the conveying mechanism portion 10, and the document sheet discharge tray 12 is arranged at substantially the right half of the upper surface of the reading unit 7. The document sheet supply tray 11 is arranged at a position apart from the document sheet discharge tray 12 in the upward direction. A space is configured between the document sheet discharge tray 12 and the document sheet supply tray 11 so that a plurality of paper sheets can be stacked therein. After conveying a document sheet set on the document sheet supply tray 11 to the reading position, the conveying mechanism portion 10 discharges the document sheet onto the document sheet discharge tray 12.

It is noted that the image forming apparatus 1 is provided with a control portion (not shown) which collectively controls an image forming operation with respect to a paper sheet, a document sheet reading operation, and the like.

Operation Device

Figure 2:
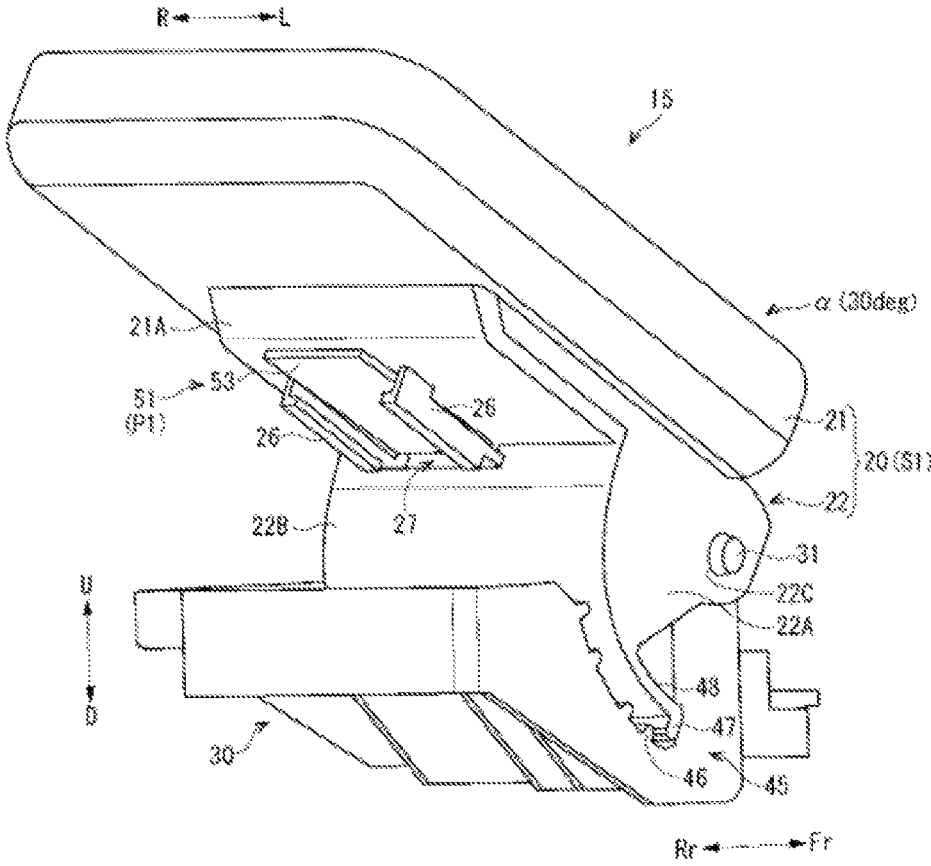
FIG. 2 is a perspective view showing an operation device (tilted angle (30 degrees)) according to the embodiment of the present disclosure.
Figure 3:
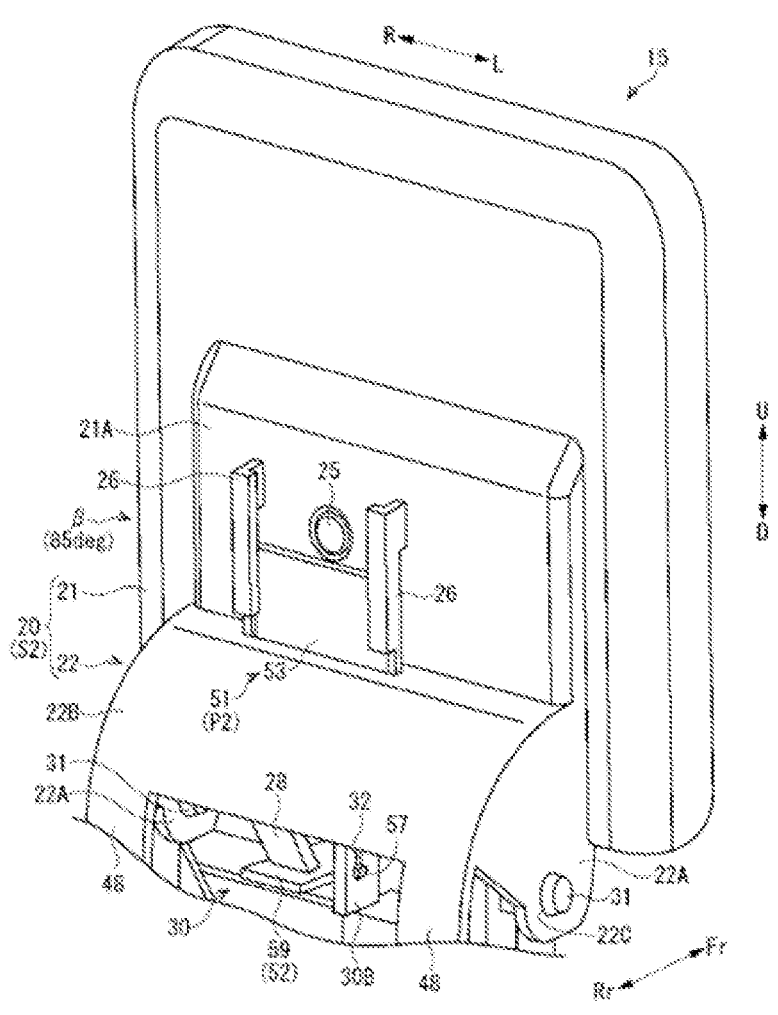
FIG. 3 is a perspective view showing the operation device (erected angle (85 degrees)) according to the embodiment of the present disclosure.
Figure 4:
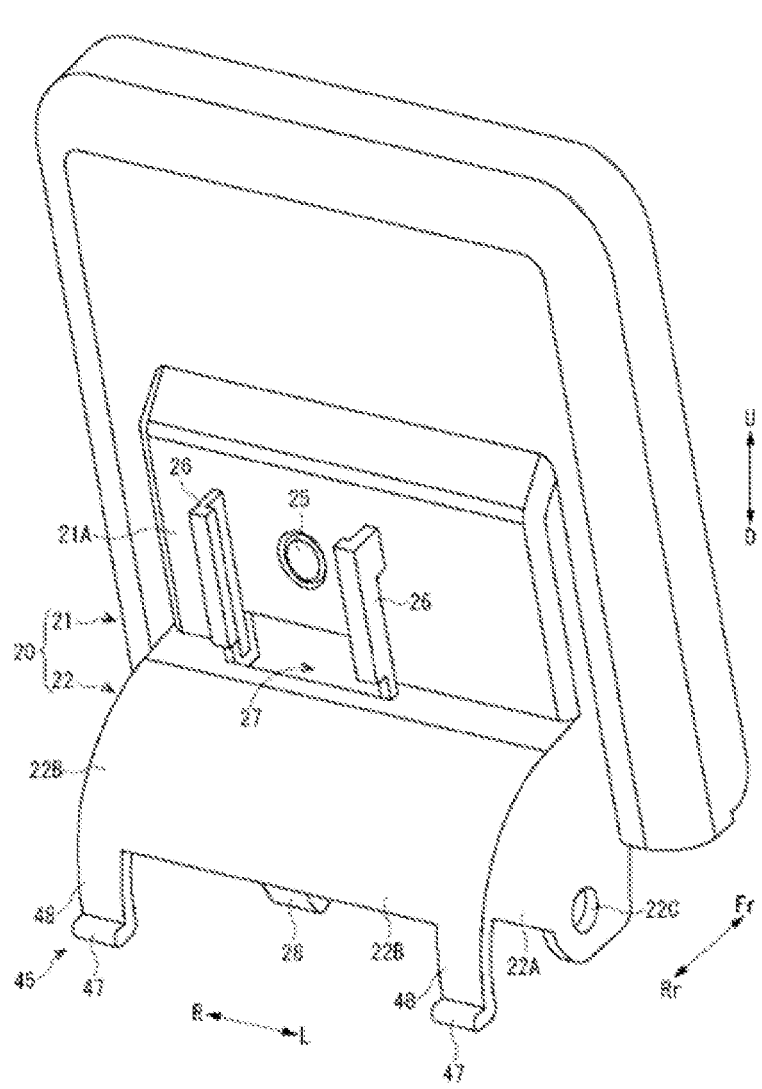
FIG. 4 is a perspective view showing an operation portion and the like of the operation device according to the embodiment of the present disclosure.
Figure 5:
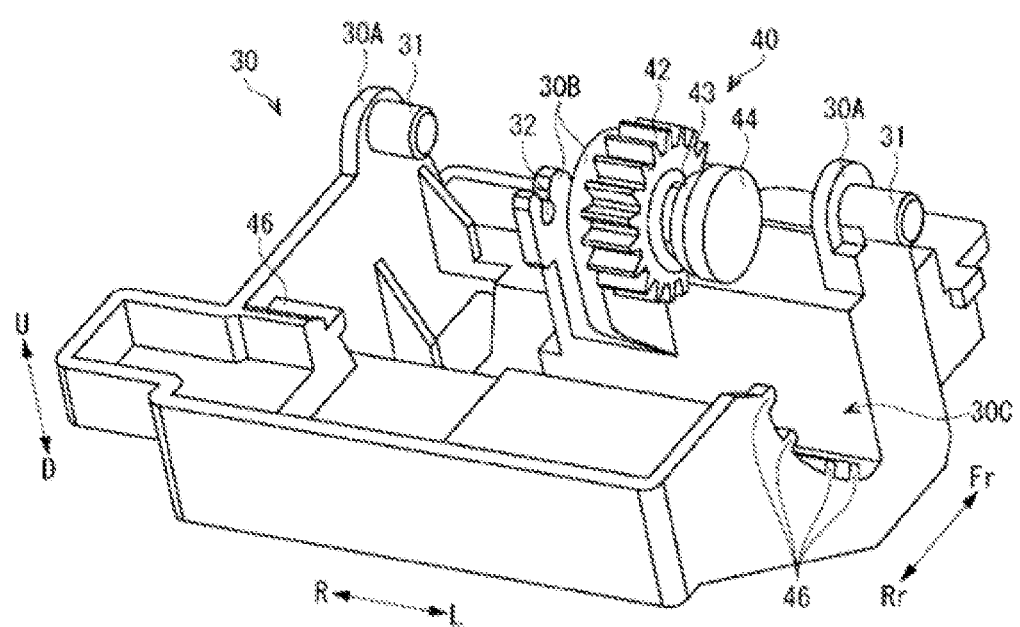
FIG. 5 is a perspective view showing an attachment portion and the like of the operation device according to the embodiment of the present disclosure.
Figure 6:
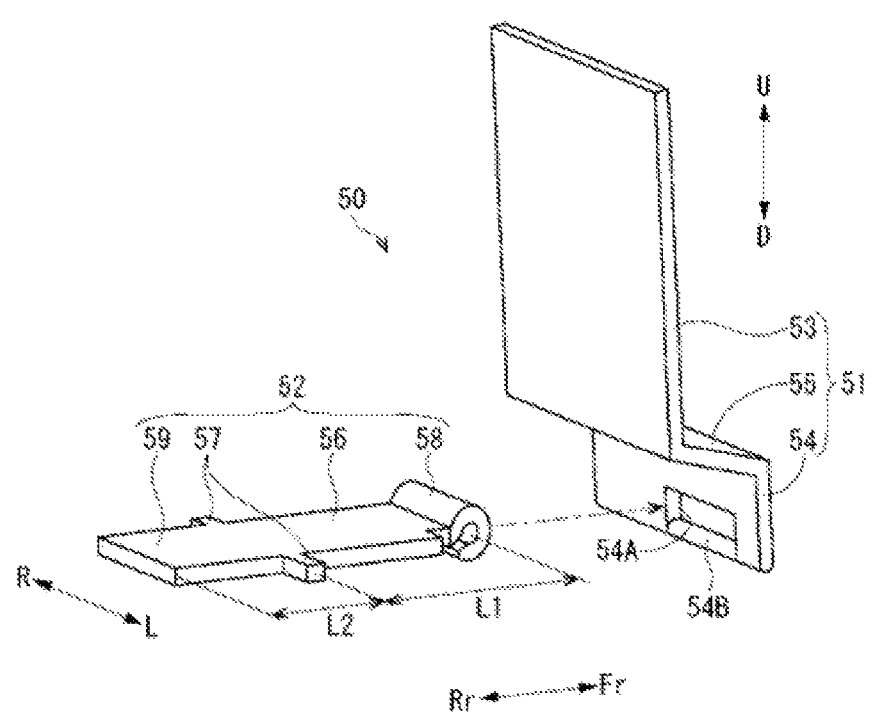
FIG. 6 is a perspective view showing an opening/closing portion of the operation device according to the embodiment of the present disclosure.

Next, the operation device 15 will be described with reference to FIG. 1 to FIG. 6. FIG. 2 is a perspective view showing the operation device 15 (tilted angle α (30 degrees)). FIG. 3 is a perspective view showing the operation device 15 (erected angle β (85 degrees)). FIG. 4 is a perspective view showing an operation portion 20 and the like of the operation device 15. FIG. 5 is a perspective view showing an attachment portion 30 and the like of the operation device 15. FIG. 6 is a perspective view showing an opening/closing portion 50 of the operation device 15.

As shown in FIG. 1 to FIG. 3, the operation device 15 includes the operation portion 20 used for inputting user operations and the attachment portion 30 which rotatably supports the operation portion 20. The operation portion 20 basically has an external appearance of a thick plate (substantially in a rectangular parallelepiped shape). As shown in FIG. 1, a touch panel 23, a home button 24, and the like that are used by the user to input various instructions for image formation, document sheet reading, and the like are provided on a front surface (an upper surface in FIG. 1) of the operation portion 20. Various types of information to be presented to the user are displayed on the touch panel 23. Meanwhile, as shown in FIG. 3, a maintenance button 25 that is operated at a time of maintenance, for example, is provided on a back surface (a lower surface in FIG. 1 (not shown in FIG. 1)) of the operation portion 20. The maintenance button 25 is, for example, a push-pull button, which is pressed by the maintenance worker for causing input/output data (log) to be output from the control portion at the time of maintenance. It is noted that the operation portion 20 (the touch panel 23, the home button 24, and the maintenance button 25) is electrically connected to the control portion to be controlled as appropriate.

The user can change the angle of the operation portion 20 as appropriate considering operability and visibility of the operation portion 20. Herein, if the maintenance button 25 is constantly exposed, there is a fear that a general user who has grabbed the operation portion 20 for changing the angle of the operation portion 20 will erroneously press the maintenance button 25, for example. Therefore, it is preferable not to expose the maintenance button 25 during normal use from the viewpoint of preventing an erroneous operation from being input. In addition, the maintenance button 25 should be operated only by the maintenance worker, and thus it is preferable to keep the maintenance button 25 out of sight of general users during normal use. In this regard, the operation device 15 according to the present embodiment is configured to be capable of covering up the maintenance button 25 during normal use.

As shown in FIG. 2 to FIG. 6, the operation device 15 includes a first angle retention portion 40, a pair of second angle retention portions 45, and the opening/closing portion 50 in addition to the operation portion 20 and attachment portion 30 described above. It is noted that since the pair of second angle retention portions 45 basically have the same structure, one of (left-side) the second angle retention portions 45 will mainly be described in descriptions below.

Operation Portion

As shown in FIG. 2 to FIG. 4, the operation portion 20 is a portion operated by the user and includes an operation body 21 and an operation support portion 22.

Operation Body

The operation body 21 is formed substantially in a thick plate shape (substantially in a rectangular parallelepiped shape) and includes a member formed of a synthetic resin, that is fixed to a metallic frame. The operation body 21 includes the touch panel 23, the home button 24, and the like as an example of a normal input portion on a front surface thereof (see FIG. 1) and includes the maintenance button 25 as an example of a special input portion on a back surface thereof (see FIG. 4). A convex surface portion 21A is formed on substantially the lower half of the back surface of the operation body 21 such that it rises rearwardly to be higher than substantially the upper half of the operation body 21. A pair of left and right slide rails 26 are provided while protruding on the convex surface portion 21A (near the center of the operation body 21 in the left-right direction). The pair of slide rails 26 extend in the up-down direction while an interval is provided therebetween in the left-right direction. The maintenance button 25 is provided at substantially the center of the interval of the pair of slide rails 26 (see FIG. 4). It is noted that the maintenance button 25 is provided such that it does not protrude from a front surface of the convex surface portion 21A (see FIG. 4).

Operation Support Portion

The operation support portion 22 is formed of a synthetic resin and is formed integrally with an exterior (formed of a synthetic resin) of the operation body 21, for example. The operation support portion 22 is provided to extend toward a rearward lower oblique direction from a lower portion of the operation body 21. The operation support portion 22 is formed in a cylindrical shape having substantially a ¼ circular cross section when seen from the side. The operation support portion 22 includes a pair of support side plates 22A formed substantially in a fan shape that is substantially a ¼ circular shape and a curved support plate 22B that is curved and is bridged between the pair of support side plates 22A. It is noted that since the pair of support side plates 22A are bilaterally symmetric, one of (left-side) the support side plates 22A will be described in descriptions below. Further, the respective figures show only the left-side support side plate 22A.

As shown in FIG. 4, a shaft hole 22C substantially in a circular shape is opened at a lower portion (a tip end portion)

of each of the support side plates 22A. The curved support plate 22B is formed to curve at substantially the same curvature as the support side plate 22A. A through-hole 27 through which a cover 51 to be described later penetrates is opened near a connection portion between the curved support plate 22B and the back surface of the operation body 21. The through-hole 27 is formed between the pair of slide rails 26. At an intermediate portion of the curved support plate 22B in the left-right direction (a position corresponding to the maintenance button 25 in the left-right direction), an abutting piece 28 extends from an inner surface of the curved support plate 22B toward an inner side of a radial direction.

As shown in FIG. 2 and FIG. 4, at lower end portions on both left and right sides of the curved support plate 22B, a pair of arm portions 48 and a pair of engagement claws 47 that are included in the second angle retention portions 45 to be described later are formed integrally. Each of the arm portions 48 extends downwardly from the lower end portion of the curved support plate 22B while being curved at substantially the same curvature as the curved support plate 22B. Each of the engagement claws 47 is provided at a tip end portion of the arm portion 48.

Attachment Portion

As shown in FIG. 5, the attachment portion 30 is formed of a synthetic resin and basically has a block shape, for example. A pair of shaft walls 30A are provided in an erected attitude on both sides of the attachment portion 30 in the left-right direction, and a pair of rotation shaft portions 31 protrude in a leftward direction from the pair of shaft walls 30A. By the operation portion 20 (the operation support portion 22) arranged on the left side of the pair of rotation shaft portions 31 being moved in the rightward direction, the pair of rotation shaft portions 31 are inserted into the pair of shaft holes 22C of the operation support portion 22 (see FIG. 2). Thus, the operation portion 20 is rotatably (swingably) supported by the attachment portion 30 (see FIG. 2). Specifically, in cooperation with the first angle retention portion 40 and the second angle retention portions 45 to be described later, the attachment portion 30 supports the operation portion 20 such that an angle of the operation portion 20 can be changed between a tilted angle α (for example, 30 degrees, 50 degrees, and 70 degrees) at which the operation portion 20 is set in a tilted attitude S1 and an erected angle β (for example, 85 degrees) at which the operation portion 20 is set in an erected attitude S2.

A pair of support walls 30B that rotatably support a lever 52 of the opening/closing portion 50 to be described later are provided in an erected attitude between the pair of rotation shaft portions 31. Each of the support walls 30B is formed with a shaft fitting portion 32 that supports a rotation shaft portion 57 of the lever 52 to be described later (only the right side is shown in FIG. 5). In addition, a gear portion 42 and the like included in the first angle retention portion 40 to be described later are attached to the left-side support wall 30B. A plurality of engagement convex portions 46 that are included in the second angle retention portion 45 to be described later are provided on both left and right sides of the attachment portion 30. It is noted that in the respective figures, only the plurality of engagement convex portions 46 on the left side are mainly shown.

First Angle Retention Portion

As shown in FIG. 5, the first angle retention portion 40 includes a rack portion 41 (see FIG. 8 to be described later), the gear portion 42, and a load portion 43. The first angle retention portion 40 has a function of retaining the operation portion 20 at an arbitrary angle including the tilted angle α and the erected angle β.

Rack Portion

The rack portion 41 is provided near the center of the operation portion 20 (the operation support portion 22) in the left-right direction. The rack portion 41 has, on the back surface of the curved support plate 22B of the operation support portion 22, a plurality of teeth arranged in a circular arc shape along the curved support plate 22B (see FIG. 8). The plurality of teeth are formed integrally with the curved support plate 22B and protrude toward the inner side of the radial direction from the back surface of the curved support plate 22B (see FIG. 8).

Gear Portion

As shown in FIG. 5, the gear portion 42 is a spur gear that is arranged so as to come into contact with a left surface of the left-side support wall 30B of the attachment portion 30. The gear portion 42 is rotatably supported by the attachment portion 30 (the left-side support wall 30B) via a bolt 44 attached to the left-side support wall 30B from the left side. The gear portion 42 intermeshes with the rack portion 41 formed on the back surface of the curved support plate 22B (see FIG. 8).

Load Portion

The load portion 43 is a coil spring that is wound around a shaft portion of the bolt 44 and provided between the gear portion 42 and a head portion (a flange portion) of the bolt 44. The load portion 43 presses the gear portion 42 against the left-side support wall 30B to thus apply a load to the rotation of the gear portion 42 and retain the gear portion 42 at an arbitrary angle.

Second Angle Retention Portion

As shown in FIG. 2, FIG. 4, and FIG. 5, the second angle retention portion 45 includes the plurality of (for example, four) engagement convex portions 46 and the engagement claws 47. The second angle retention portion 45 has a function of retaining the operation portion 20 at an angle selected from the three tilted angles α and the one erected angle β.

Engagement Convex Portion

The plurality of engagement convex portions 46 as an example of a plurality of engagement portions are provided on both left and right sides of the attachment portion 30. Specifically, as shown in FIG. 5, a notched portion 30C having substantially a fan shape that becomes substantially a ¼ circular shape along a rotation trajectory of the curved support plate 22B (the arm portion 48) is formed on a left-side side wall of the attachment portion 30, and the plurality of engagement convex portions 46 protrude along a curved edge portion of the notched portion 30C with intervals provided therebetween. The plurality of engagement convex portions 46 on the right side are formed along the right-side side wall of the attachment portion 30 (only the left-side engagement convex portions 46 are shown in FIG. 5). The plurality of engagement convex portions 46 are provided in accordance with the three tilted angles α (30 degrees, 50 degrees, and 70 degrees) and the one erected angle β (85 degrees).

Engagement Claw

As shown in FIG. 2 and FIG. 4, the engagement claw 47 as an example of a to-be-engaged portion is provided in the arm portion 48 of the operation portion 20. The engagement claws 47 protrude toward an outer side of the radial direction from the tip end portions of the arm portions 48 and thus engage with one engagement convex portion 46 selected from the plurality of engagement convex portions 46.

Opening/Closing Portion

As shown in FIG. 6, the opening/closing portion 50 includes the cover 51 and the lever 52. The opening/closing portion 50 has a function of covering up the maintenance button 25 when the operation portion 20 is set at the tilted angle α (30 degrees, 50 degrees, and 70 degrees) and exposing the maintenance button 25 when the operation portion 20 is set at the erected angle β (85 degrees).

Cover

The cover 51 is molded integrally by a synthetic resin, for example, and has substantially a crank shape when seen from the side surface. The cover 51 includes a body plate 53, a coupling plate 54, and a bridge plate 55.

The body plate 53 is formed in a flat plate shape having substantially the same height as the convex surface portion 21A of the operation portion 20. The coupling plate 54 is formed in a flat plate shape having a smaller height than the body plate 53 and is arranged to be substantially parallel with the body plate 53 at a position below and on the front side of the body plate 53. The bridge plate 55 is bridged between a lower end of the body plate 53 and an upper end of the coupling plate 54. The bridge plate 55 is formed in a flat plate shape having a length that is substantially the same as a thickness of the convex surface portion 21A of the operation portion 20 and is tilted downwardly from the rear side toward the front side when seen from the side surface. A coupling hole 54A substantially in a rectangular shape is opened on a lower side of the coupling plate 54, and a lower end of the coupling plate 54 (a lower edge portion of the coupling hole 54A) becomes a support shaft portion 54B having substantially a cylindrical shape.

The body plate 53 passes through the through-hole 27 opened in the operation portion 20 from below and is inserted between the pair of slide rails 26 so as to come into contact with the front surface of the convex surface portion 21A or oppose the front surface of the convex surface portion 21A with a slight gap therebetween (see FIG. 2 and FIG. 3). The body plate 53 is supported while being slidable along the pair of slide rails 26. Specifically, the cover 51 (the body plate 53) is supported by the operation portion 20 while being slidable between a closing position P1 at which the maintenance button 25 is covered up (see FIG. 2) and an opening position P2 at which the maintenance button 25 is exposed (see FIG. 3). The bridge plate 55 extends toward the front surface of the operation body 21 (the touch panel 23 side) at a position below the convex surface portion 21A.

Lever

The lever 52 is formed of a synthetic resin and is formed substantially in a flat plate shape, for example. The lever 52 includes a lever body portion 56, a pair of rotation shaft portions 57, a hook portion 58, and an abutting surface portion 59. The rotation shaft portion 57, the hook portion 58, and the abutting surface portion 59 are formed integrally with the lever body portion 56.

The lever body portion 56 is formed substantially in a rectangular plate shape extending in the longitudinal direction. The pair of rotation shaft portions 57 protrude outwardly from both side portions of the intermediate portion of the lever body portion 56 in the longitudinal direction. Each of the rotation shaft portions 57 is a protrusion formed substantially in a rectangular parallelepiped shape. The pair of rotation shaft portions 57 are provided at positions deviated toward the other side (the abutting piece 28 side) from the center in the longitudinal direction. As an example, in the present embodiment, a distance (L1) from one end portion of the lever body portion 56 in the longitudinal direction (a shaft center of the hook portion 58) to (a shaft center of) the rotation shaft portion 57 is set to be about twice as large as a distance (L2) from the other end portion of the lever body portion 56 in the longitudinal direction to (the shaft center of) the rotation shaft portion 57 (L1:L2=2: 1).

The hook portion 58 is provided at one end portion of the lever body portion 56 in the longitudinal direction. The hook portion 58 is curved substantially in a fishhook shape (substantially in a hook shape) and has a shape in which a part of a circular arc is notched when seen from the side surface. The abutting surface portion 59 is formed at the other end portion of the lever body portion 56 in the longitudinal direction. To be exact, the abutting surface portion 59 is a part of the lever body portion 56 extending more toward the other side of the flow direction than the rotation shaft portions 57.

The lever 52 is arranged between the pair of support walls 30B provided in the attachment portion 30, and the pair of rotation shaft portions 57 rotatably fit into the pair of shaft fitting portions 32 formed in the pair of support walls 30B (see FIG. 3). The hook portion 58 is inserted into the coupling hole 54A formed in the cover 51 and rotatably fits with the support shaft portion 54B (see FIG. 9 to be described later). The abutting surface portion 59 is abutted against (a tip end of) the abutting piece 28 provided in the operation portion 20 (see FIG. 3). In this state, the lever 52 is rotatably supported by the attachment portion 30 at an intermediate portion in the longitudinal direction, one end portion of the lever 52 in the longitudinal direction is movably engaged with the cover 51, and the other end portion of the lever 52 in the longitudinal direction is movably engaged with the operation portion 20 (see FIG. 9 to be described later).

Change of Angle of Operation Portion

Figure 7:
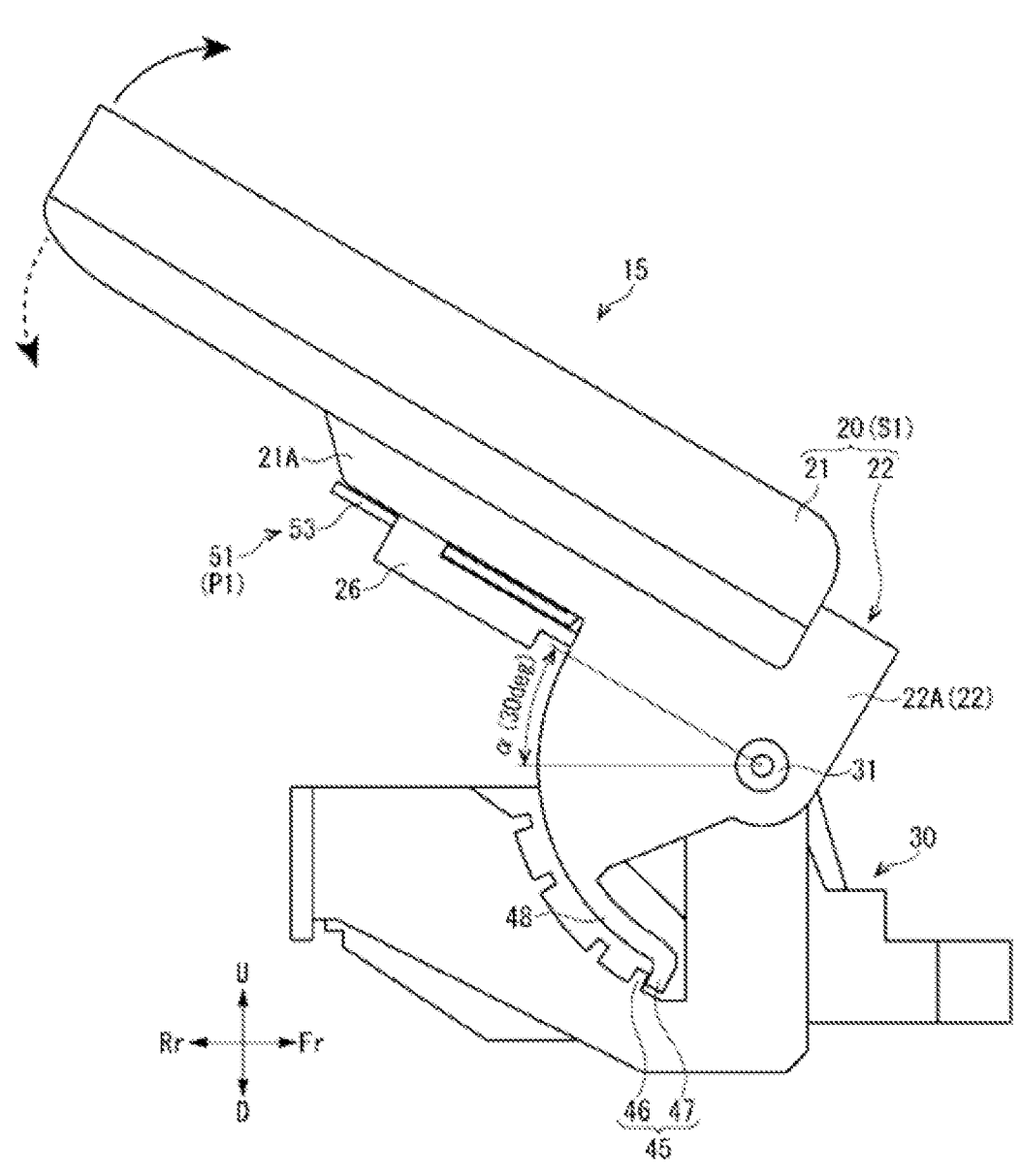
FIG. 7 is a left side view showing the operation device (tilted angle (30 degrees)) according to the embodiment of the present disclosure.
Figure 8:
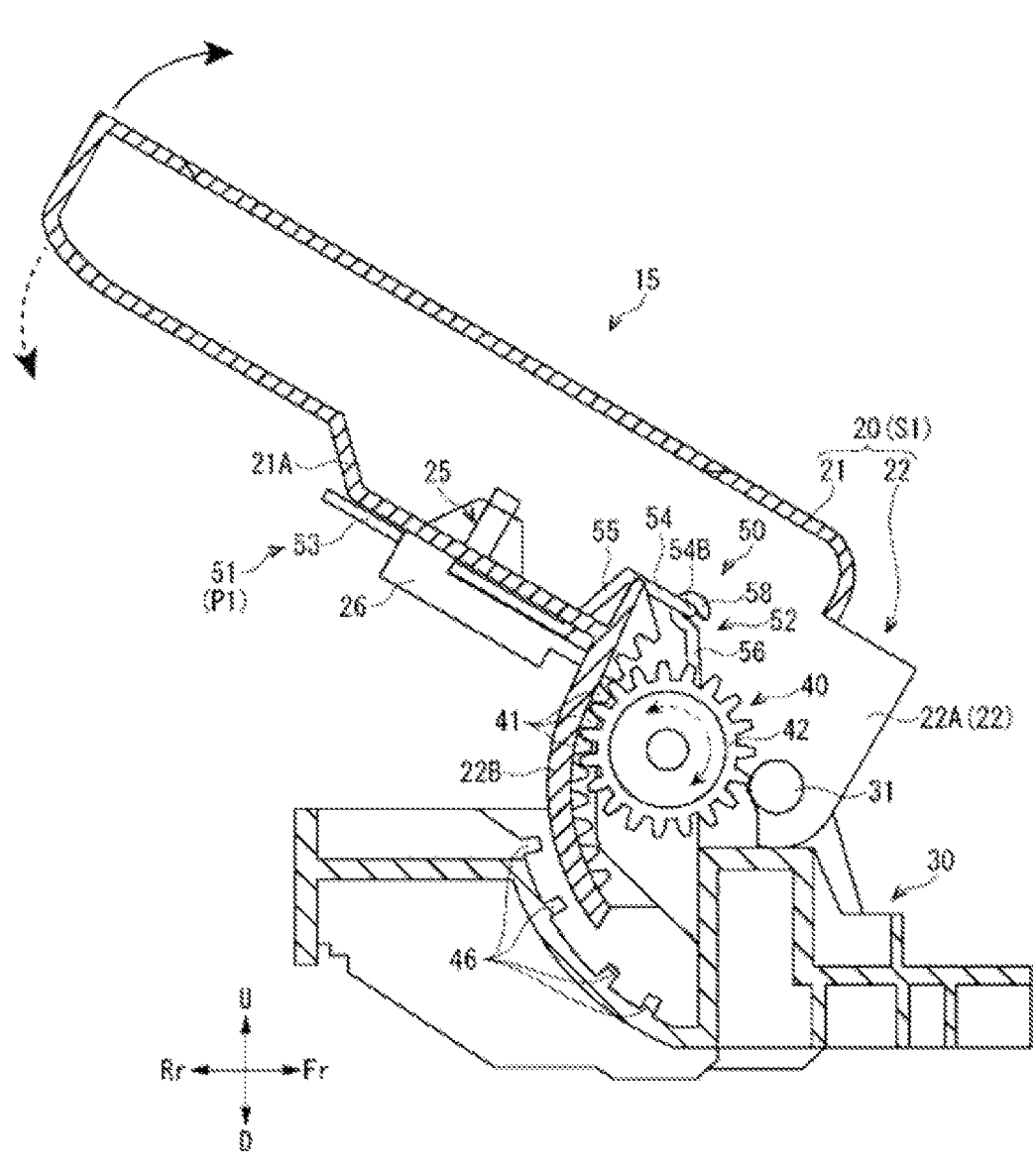
FIG. 8 is a cross-sectional view showing a first angle retention portion and the like of the operation device (tilted angle (30 degrees)) according to the embodiment of the present disclosure.
Figure 9:
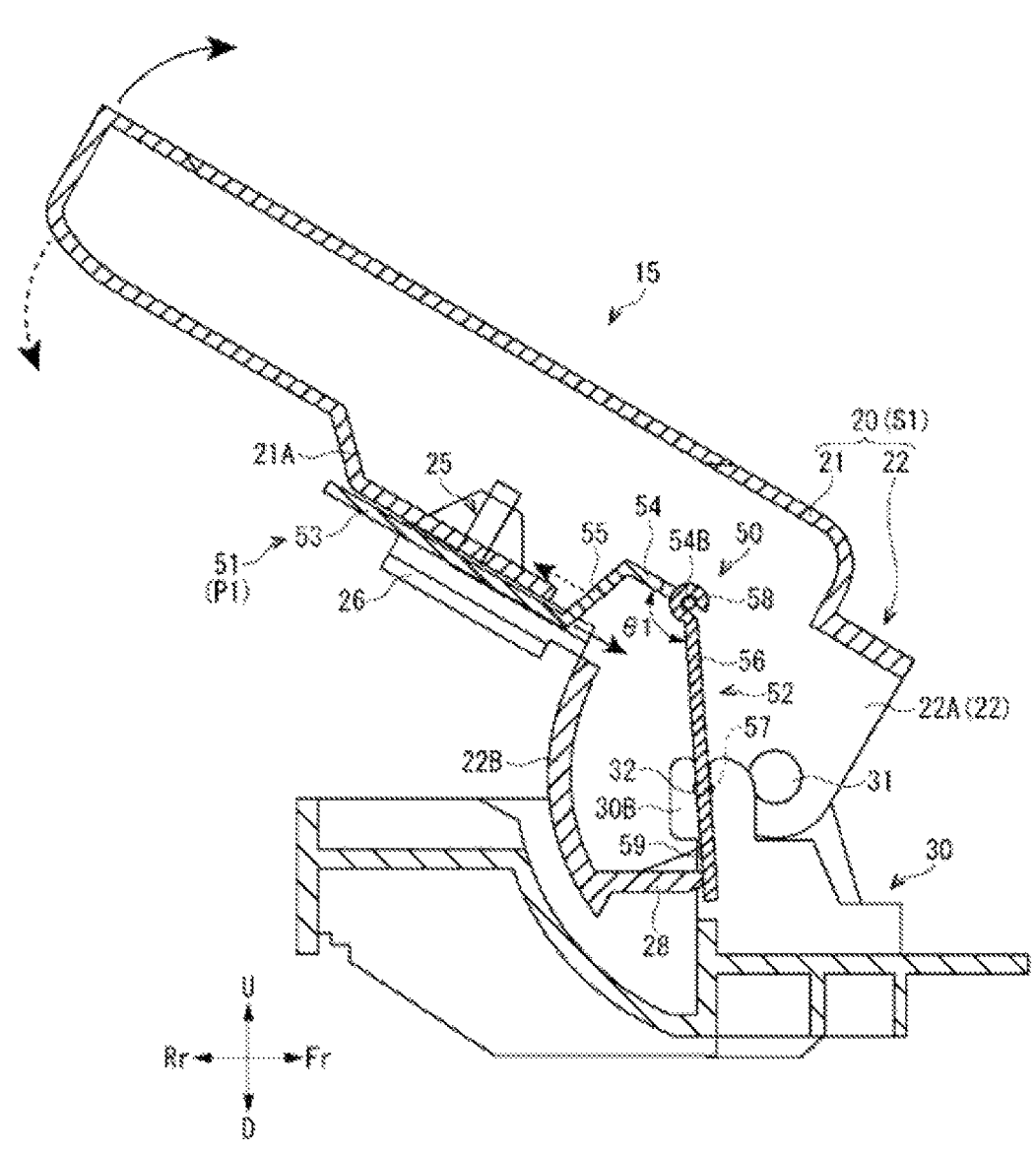
FIG. 9 is a cross-sectional view showing the opening/closing portion and the like of the operation device (tilted angle (30 degrees)) according to the embodiment of the present disclosure.
Figure 10:
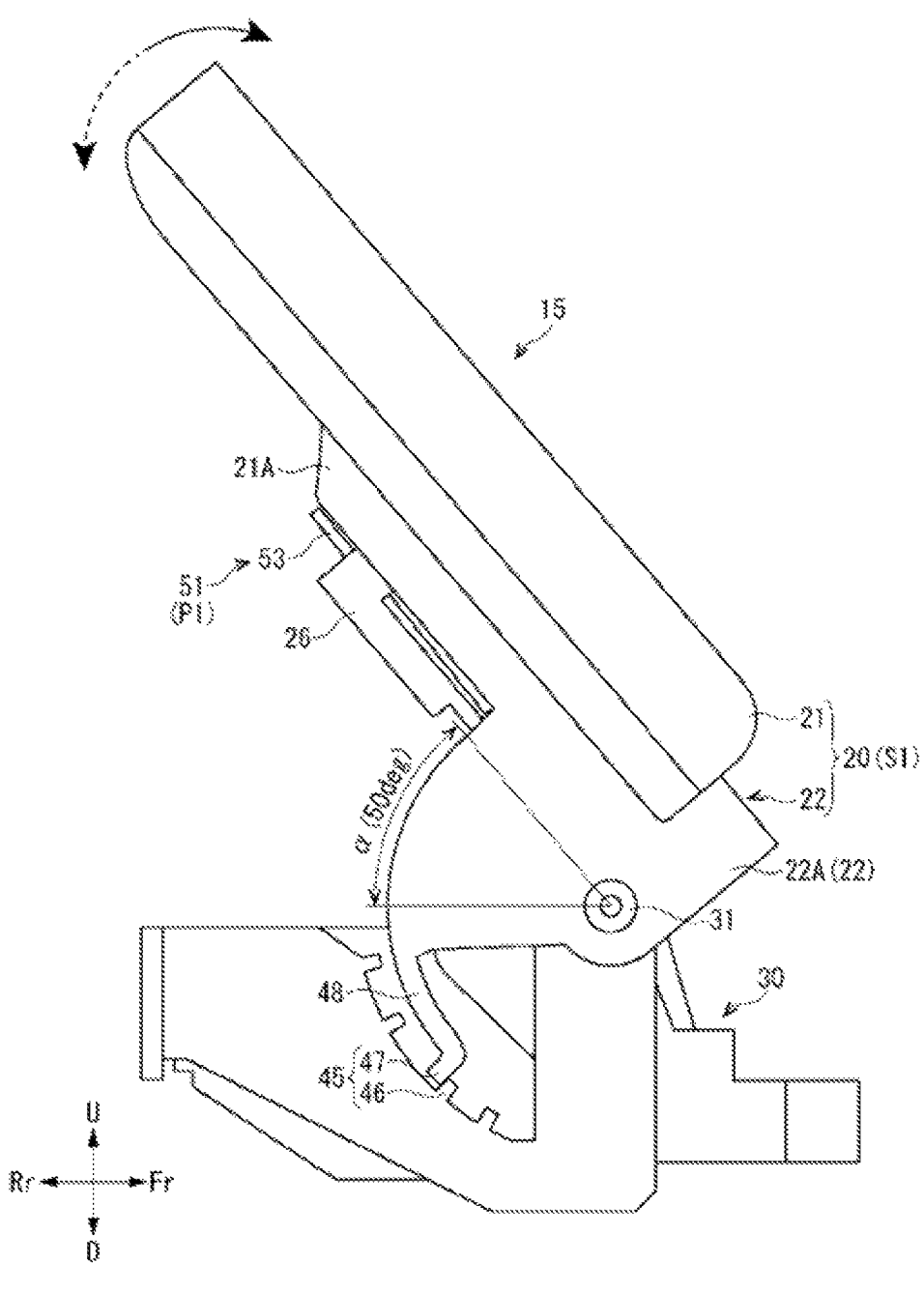
FIG. 10 is a left side view showing the operation device (tilted angle (50 degrees)) according to the embodiment of the present disclosure.
Figure 11:
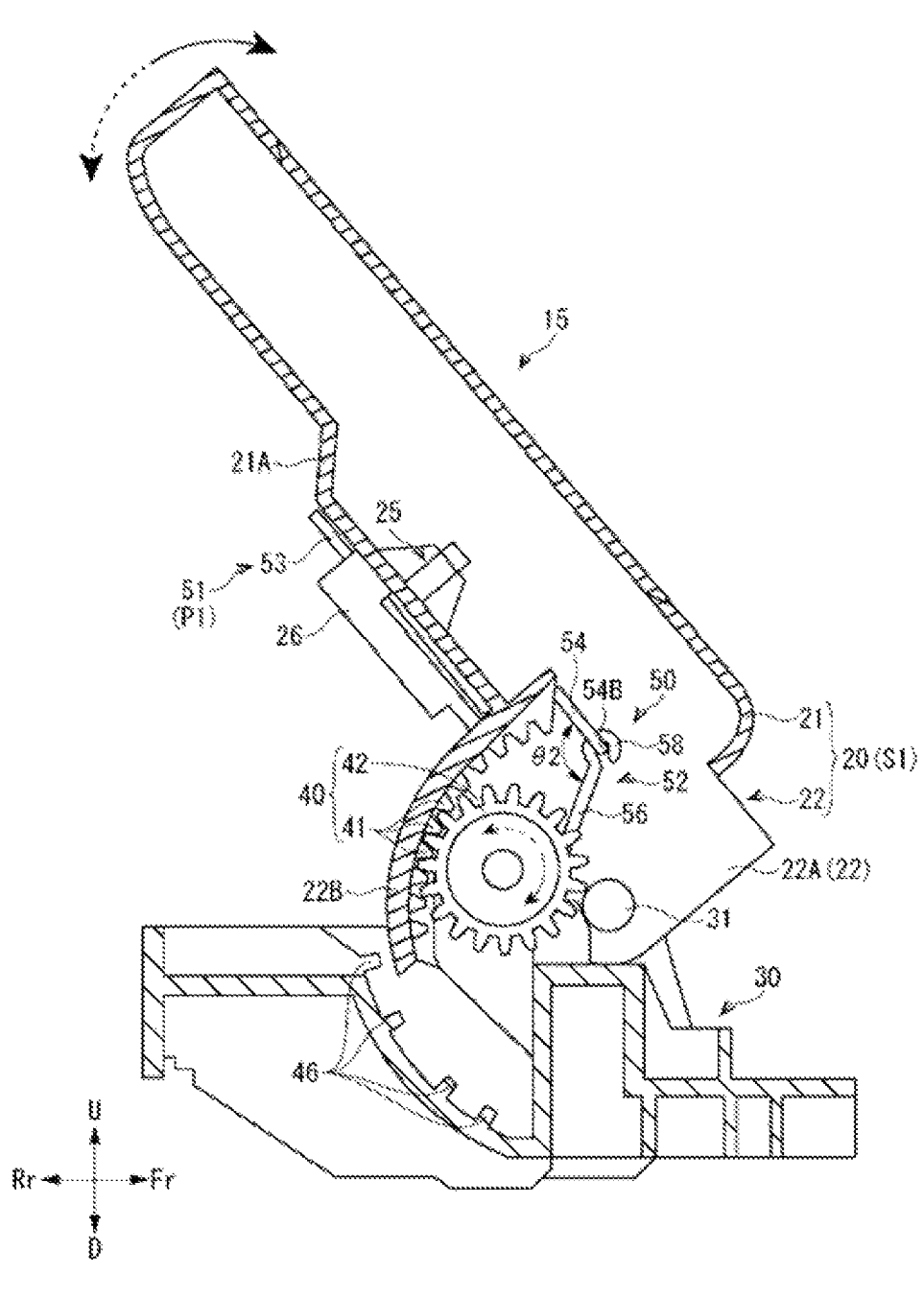
FIG. 11 is a cross-sectional view showing the first angle retention portion and the like of the operation device (tilted angle (50 degrees)) according to the embodiment of the present disclosure.
Figure 12:
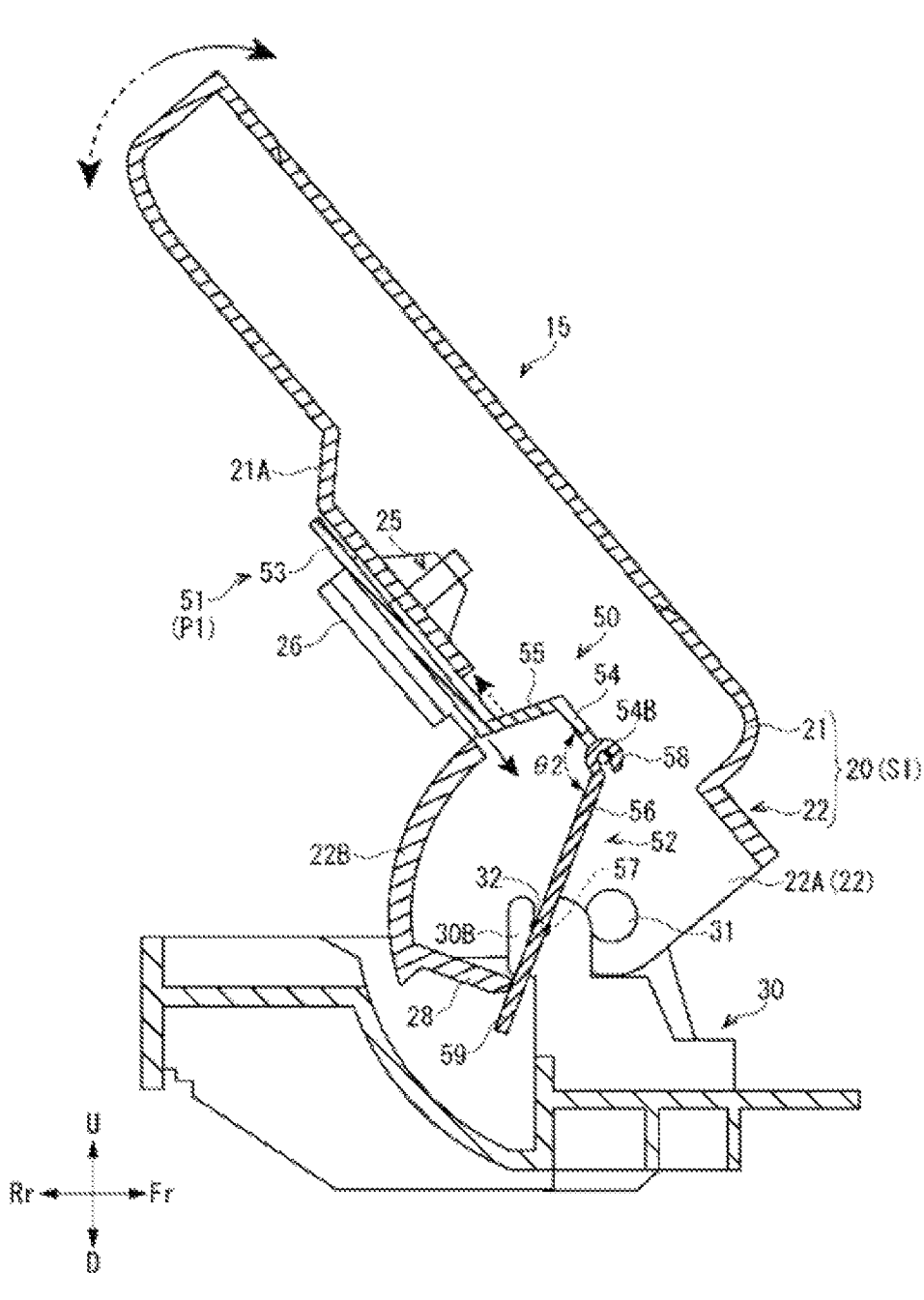
FIG. 12 is a cross-sectional view showing the opening/closing portion and the like of the operation device (tilted angle (50 degrees)) according to the embodiment of the present disclosure.
Figure 13:
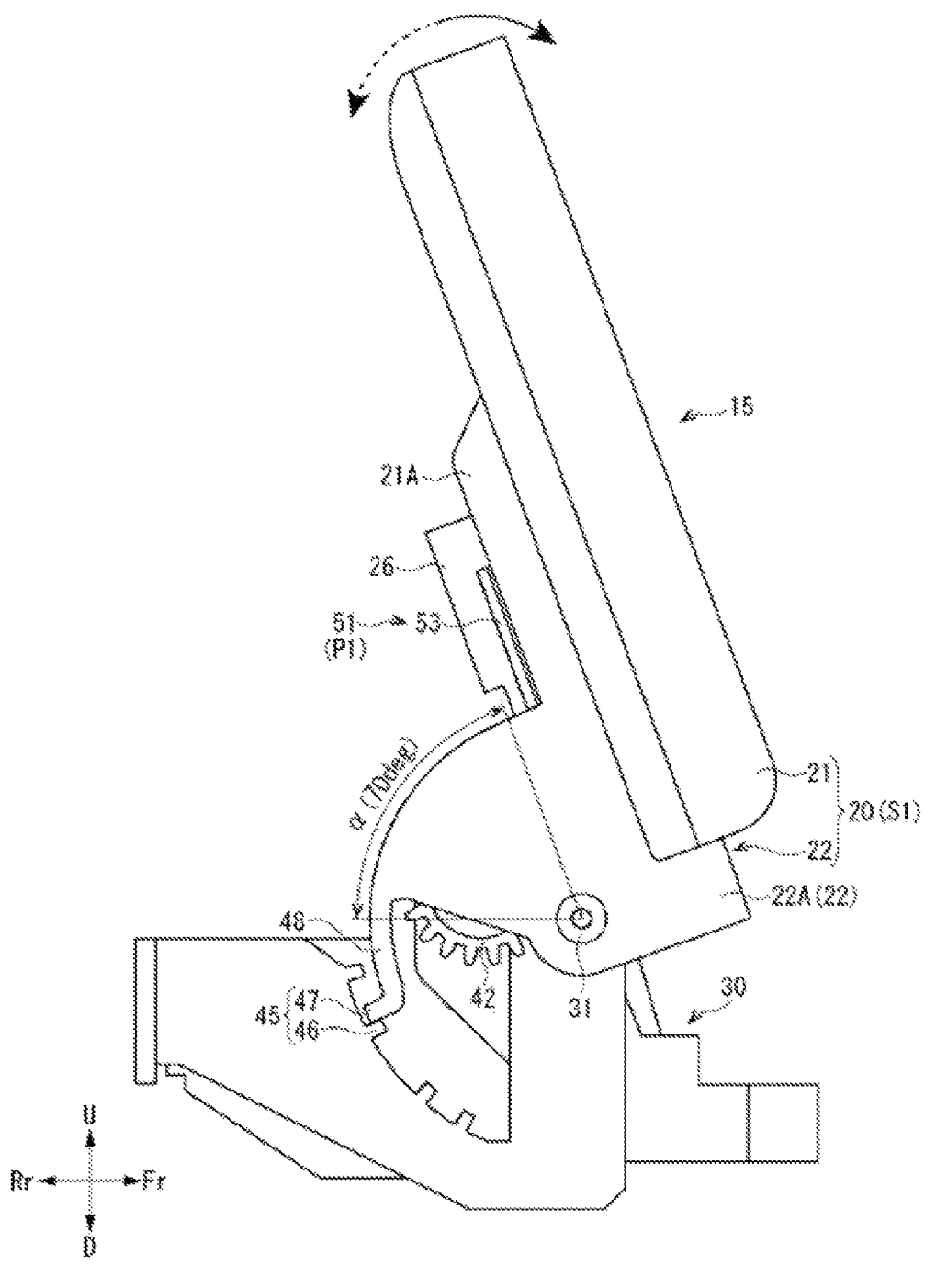
FIG. 13 is a left side view showing the operation device (tilted angle (70 degrees)) according to the embodiment of the present disclosure.
Figure 14:
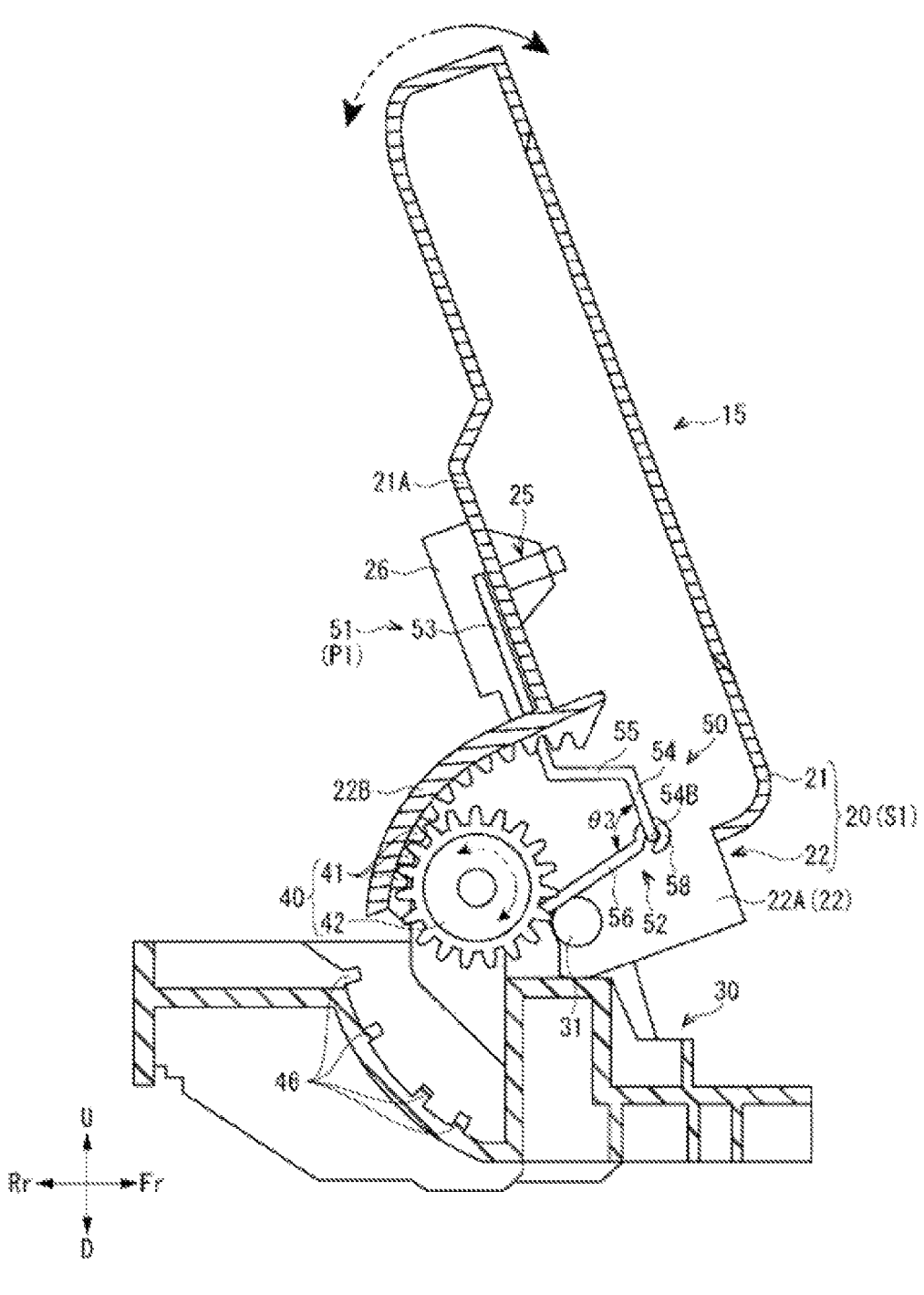
FIG. 14 is a cross-sectional view showing the first angle retention portion and the like of the operation device (tilted angle (70 degrees)) according to the embodiment of the present disclosure.
Figure 15:
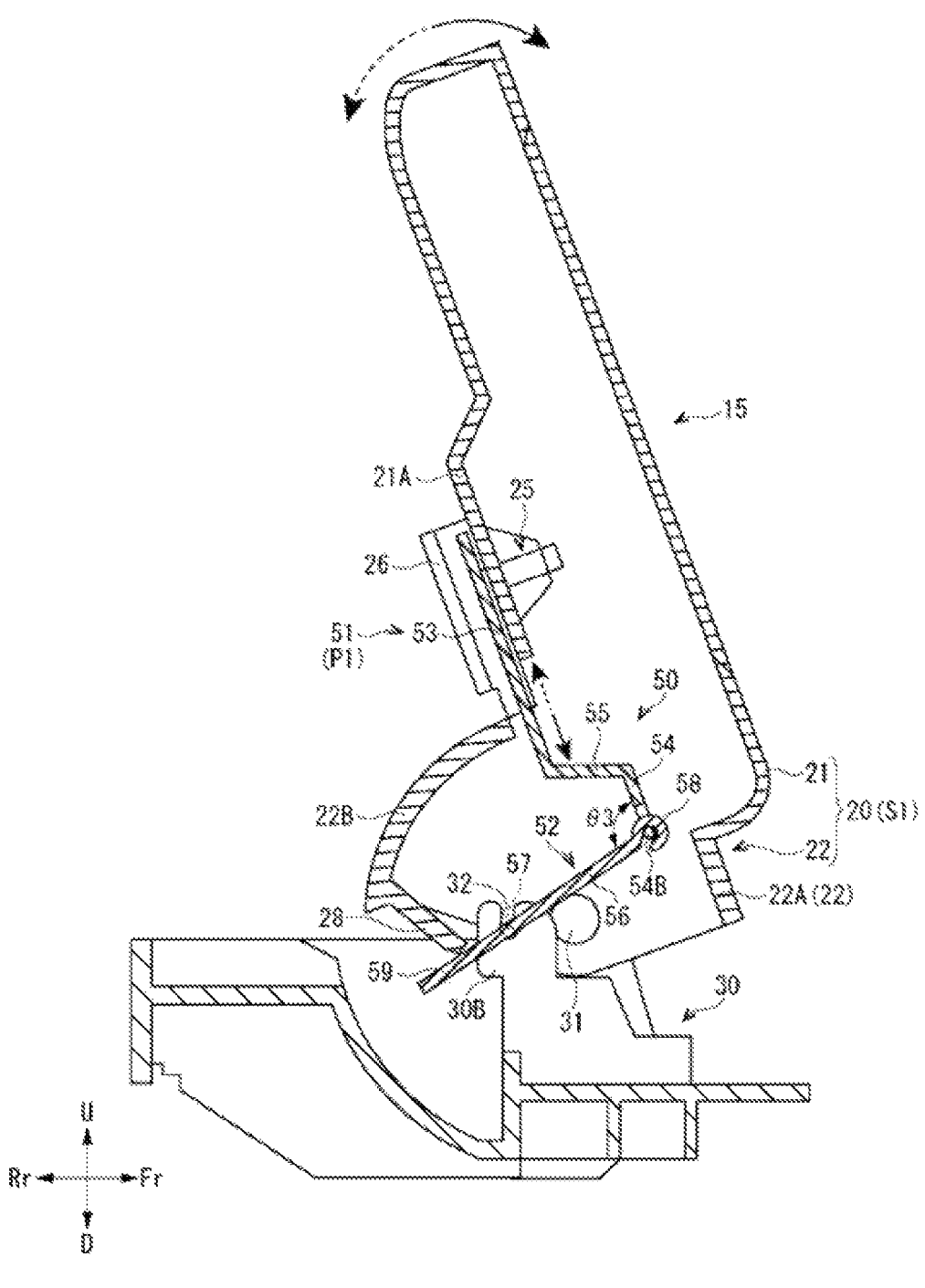
FIG. 15 is a cross-sectional view showing the opening/closing portion and the like of the operation device (tilted angle (70 degrees)) according to the embodiment of the present disclosure.
Figure 16:
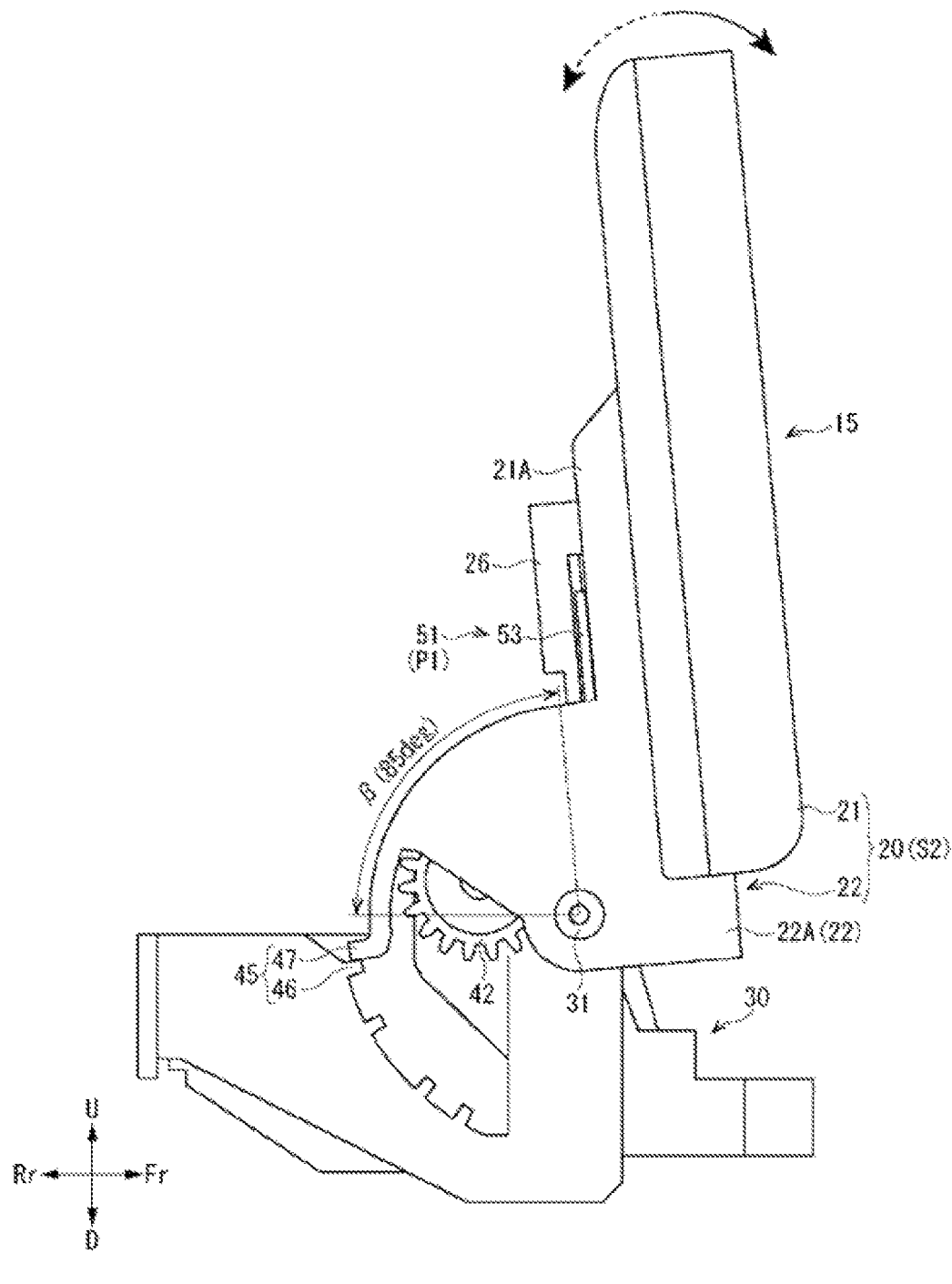
FIG. 16 is a left side view showing the operation device (erected angle (85 degrees)) according to the embodiment of the present disclosure.
Figure 17:
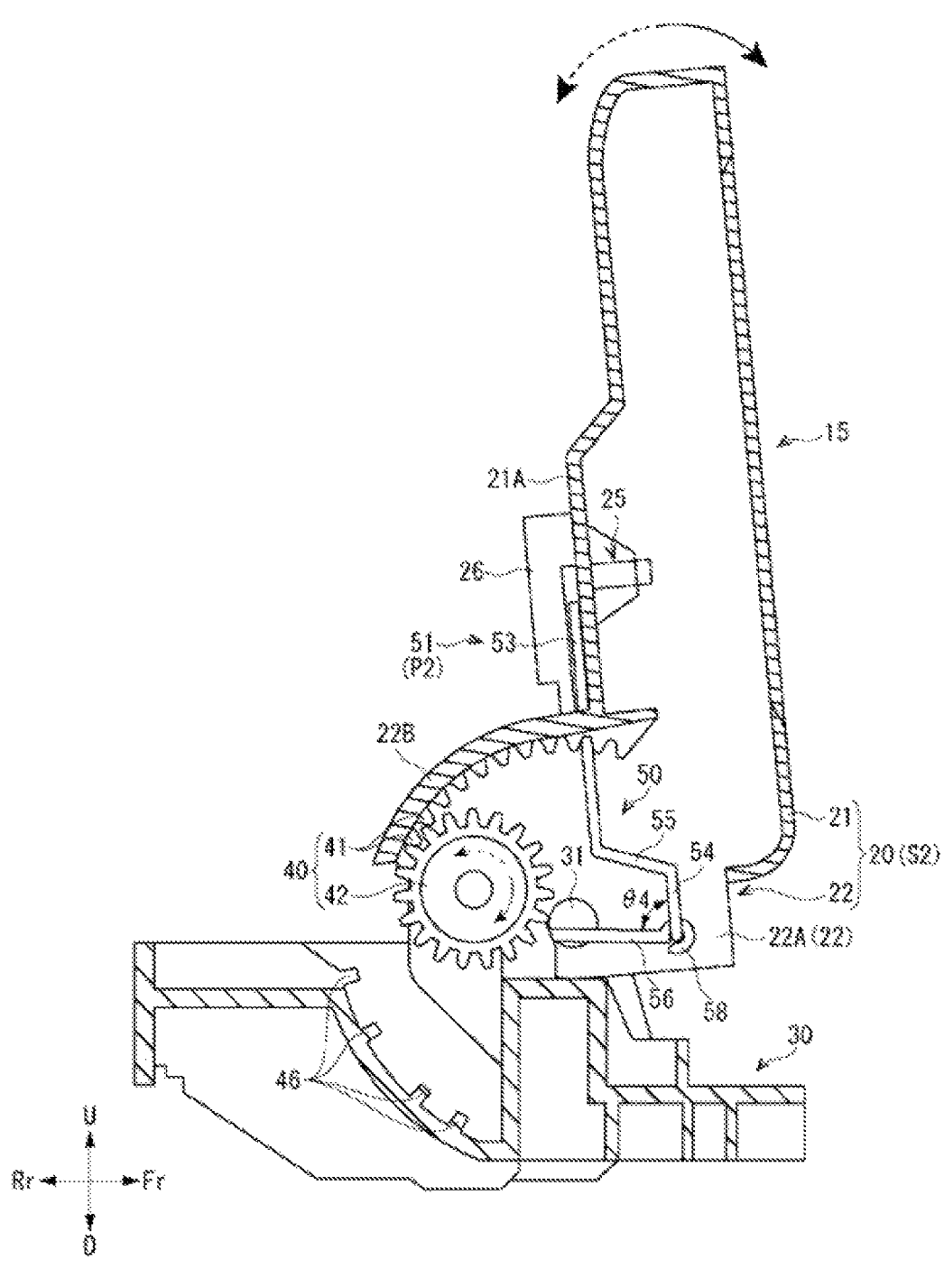
FIG. 17 is a cross-sectional view showing the first angle retention portion and the like of the operation device (erected angle (85 degrees)) according to the embodiment of the present disclosure.
Figure 18:
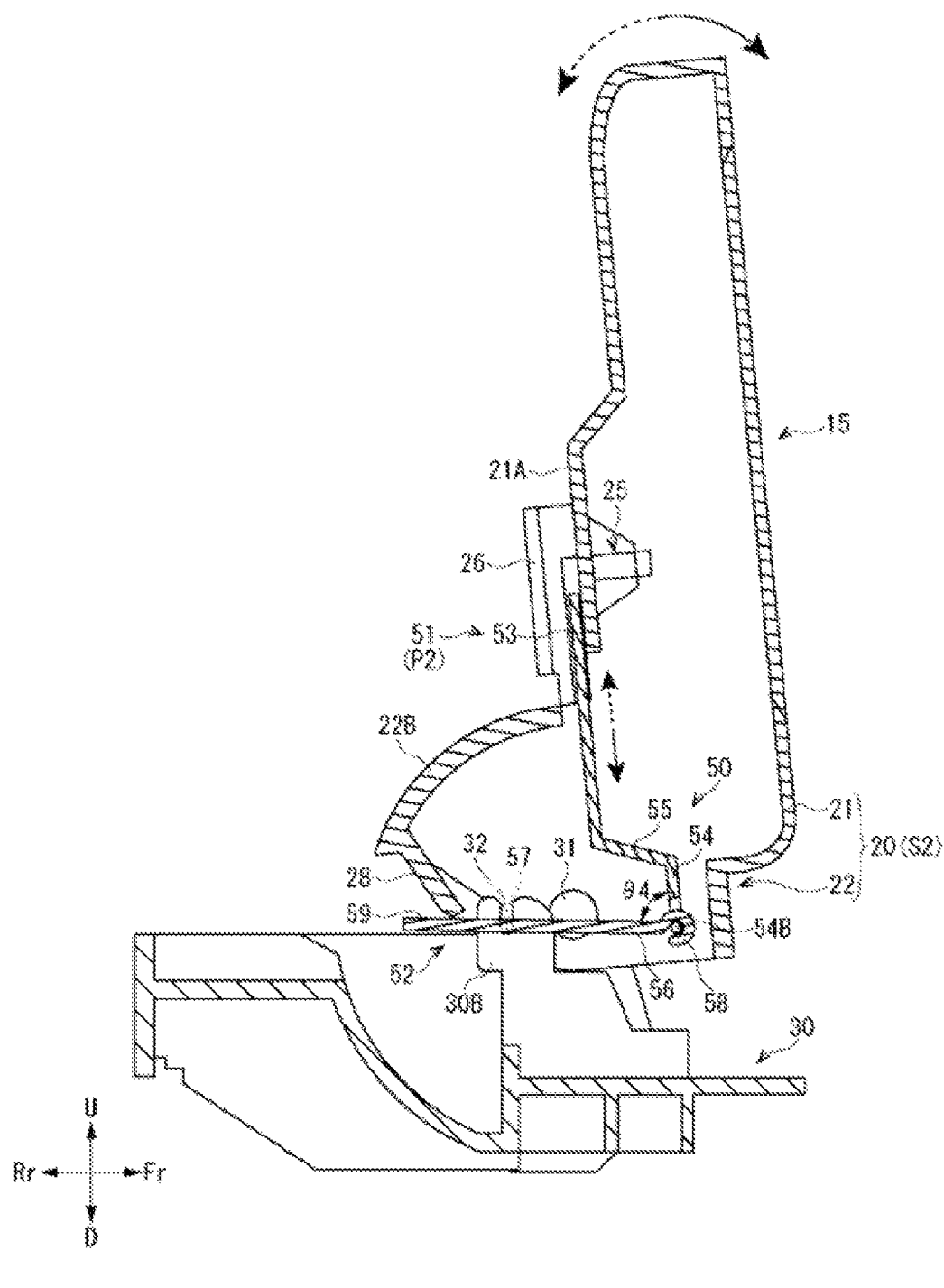
FIG. 18 is a cross-sectional view showing the opening/closing portion and the like of the operation device (erected angle (85 degrees)) according to the embodiment of the present disclosure.

Next, a case of changing an angle (changing an attitude) of the operation portion 20 will be described with reference to FIG. 7 to FIG. 18. FIG. 7 is a left side view showing the operation device 15 (tilted angle α (30 degrees)). FIG. 8 is a cross-sectional view showing the first angle retention portion 40 and the like of the operation device 15 (tilted angle α (30 degrees)). FIG. 9 is a cross-sectional view showing the opening/closing portion 50 and the like of the operation device 15 (tilted angle α (30 degrees)). FIG. 10 is a left side view showing the operation device 15 (tilted angle α (50 degrees)). FIG. 11 is a cross-sectional view showing the first angle retention portion 40 and the like of the operation device 15 (tilted angle α (50 degrees)). FIG. 12 is a cross-sectional view showing the opening/closing portion 50 and the like of the operation device 15 (tilted angle α (50 degrees)). FIG. 13 is a left side view showing the operation device 15 (tilted angle α (70 degrees)). FIG. 14 is a cross-sectional view showing the first angle retention portion 40 and the like of the operation device 15 (tilted angle α (70 degrees)). FIG. 15 is a cross-sectional view showing the opening/closing portion 50 and the like of the operation device 15 (tilted angle α (70 degrees)). FIG. 16 is a left side view showing the operation device 15 (erected angle β (85 degrees)). FIG. 17 is a cross-sectional view showing the first angle retention portion 40 and the like of the operation device 15 (erected angle β (85 degrees)). FIG. 18 is a cross-sectional view showing the opening/closing portion 50 and the like of the operation device 15 (erected angle β (85 degrees)). It is noted that in the present specification, for convenience of descriptions, it is assumed that the angle of the operation portion 20 with respect to the attachment portion 30 (a horizontal line) is the tilted angle α (30 degrees) as an initial state of the operation portion 20. In addition, the angle of the operation portion 20 (the tilted angle α, the erected angle β) refers to an angle formed between the horizontal line that passes through the shaft centers of the rotation shaft portions 31 and the cover 51 (the body plate 53) or the back surface of the operation portion 20 (the convex surface portion 21A).

Tilted Angle=30 Degrees

When the tilted angle α of the operation portion 20 set in the tilted attitude S1 is 30 degrees, the engagement claws 47 of the second angle retention portion 45 are caught on a lower side (a front side) of the lowermost (frontmost) engagement convex portion 46 (see FIG. 7). The gear portion 42 of the first angle retention portion 40 intermeshes with the teeth at root-side positions of the curved support plate 22B of the rack portion 41 (see FIG. 8). The gear portion 42 is applied with a load from the load portion 43 and does not rotate by the weight of the operation portion 20. Therefore, the operation portion 20 is retained in the tilted attitude S1 (tilted angle α (30 degrees)) (see FIG. 7 to FIG. 9). In addition, as shown in FIG. 7 to FIG. 9, the body plate 53 of the cover 51 covers the entire convex surface portion 21A of the operation portion 20. In other words, the cover 51 is arranged at the closing position P1 (30 degrees) at which it covers up the maintenance button 25, and thus the maintenance button 25 is not exposed (also see FIG. 2). The lever 52 is substantially in an erected attitude in which the hook portion 58 is positioned on the upper side. An angle formed between the coupling plate 54 of the cover 51 and the lever body portion 56 of the lever 52 (θ1) is an obtuse angle (see FIG. 9).

Tilted Angle=50 Degrees

When the tilted angle α of the operation portion 20 is changed from 30 degrees to 50 degrees, the user holds the operation portion 20 and pulls up the operation portion 20 in the front direction by a force exceeding the load applied by the load portion 43 (see the arrow in the solid line in FIG. 10). The operation portion 20 rotates clockwise about the rotation shaft portions 31, and the rack portion 41 provided in the operation support portion 22 (the curved support plate 22B) causes the gear portion 42 to rotate clockwise against the load applied by the load portion 43 (see the arrow in the solid line in FIG. 11). The engagement claws 47 of the second angle retention portion 45 pass beyond the bottommost engagement convex portion 46 and the second engagement convex portion 46 from the bottom while causing the arm portions 48 to bow, and are thus caught on the upper side of the second engagement convex portion 46 from the bottom (see FIG. 10). In this state, when the rotation of the operation portion 20 by the user is stopped, the operation portion 20 is retained in the tilted attitude S1 (tilted angle α (50 degrees)) by the load from the load portion 43. In addition, along with the rotation of the operation portion 20 (a contact point (effort) between the abutting piece 28 and the abutting surface portion 59), the lever 52 pulls down the cover 51 (the support shaft portion 54B (load) fit to the hook portion 58) while rotating clockwise using the rotation shaft portions 57 as a fulcrum (see the arrow in the solid line in FIG. 12). Also in this state, the cover 51 (the body plate 53) is arranged at the closing position P1 (50 degrees) at which it covers up the maintenance button 25, and thus the maintenance button 25 is not exposed (see FIG. 11 and FIG. 12). The angle formed between the coupling plate 54 and the lever body portion 56 (θ2) is an obtuse angle smaller than the angle (θ1) described above (θ1>θ2 (see FIG. 11 and FIG. 12)).

Tilted Angle=70 Degrees

The case of changing the tilted angle α of the operation portion 20 from 50 degrees to 70 degrees is also similar to the case described above where the tilted angle α is changed from 30 degrees to 50 degrees. The user pulls up the operation portion 20 in the front direction so that the operation portion 20 rotates about the rotation shaft portions 31 and the rack portion 41 causes the gear portion 42 to rotate against the load applied by the load portion 43 (see the arrow in the solid line in each of FIG. 13 and FIG. 14). The engagement claws 47 pass beyond the second and third engagement convex portions 46 from the bottom while causing the arm portions 48 to bow, and are thus caught on the upper side of the third engagement convex portion 46 from the bottom (see FIG. 13). In this state, the operation portion 20 is retained in the tilted attitude S1 (tilted angle α (70 degrees)) by the load from the load portion 43. In addition, along with the rotation of the operation portion 20, the lever 52 further pulls down the cover 51 while rotating about the rotation shaft portions 57 (see the arrow in the solid line in FIG. 15). Also in this state, the cover 51 (the body plate 53) is arranged at the closing position P1 (70 degrees) at which it covers up the maintenance button 25, and thus the maintenance button 25 is not exposed (see FIG. 14 and FIG. 15). The angle formed between the coupling plate 54 and the lever body portion 56 (θ3) is an obtuse angle smaller than the angle (θ2) described above (θ2>θ3 (see FIG. 14 and FIG. 15)).

Erected Angle=85 Degrees

When executing maintenance, the maintenance worker changes the angle of the operation portion 20 from the tilted angle α (70 degrees) to the erected angle β (85 degrees). This case is also basically similar to the case described above where the user changes the tilted angle α (30 degrees, 50 degrees, 70 degrees) of the operation portion 20. The maintenance worker pulls up the operation portion 20 in the front direction so that the operation portion 20 rotates about the rotation shaft portions 31 and the rack portion 41 causes the gear portion 42 to rotate against the load applied by the load portion 43 (see the arrow in the solid line in each of FIG. 16 and FIG. 17). The gear portion 42 intermeshes with the teeth at the tip end side of the curved support plate 22B of the rack portion 41. The engagement claws 47 pass beyond the third engagement convex portion 46 from the bottom and the uppermost engagement convex portion 46 while causing the arm portions 48 to bow, and are thus caught on the upper side of the uppermost engagement convex portion 46 (see FIG. 16). In this state, the operation portion 20 is retained in the erected attitude S2 (erected angle β (85 degrees)) by the load from the load portion 43. In addition, along with the rotation of the operation portion 20, the lever 52 further pulls down the cover 51 while rotating about the rotation shaft portions 57 (see the arrow in the solid line in FIG. 18). In this state, the cover 51 (the body plate 53) is arranged at the opening position P2 at which it exposes the maintenance button 25, and thus the maintenance worker can press the maintenance button 25 (also see FIG. 3). The angle formed between the coupling plate 54 and the lever body portion 56 (θ4) becomes smaller than the angle (θ3) described above and becomes substantially a right angle (or an acute angle) (θ3>θ4 (see FIG. 17 and FIG. 18)).

It is noted that in the descriptions above related to the change of the angle (the change of the attitude) of the operation portion 20, the angle has been changed step by step in the order of 30 degrees, 50 degrees, 70 degrees, and 85 degrees. However, the present disclosure is not limited to this, and the angle may be changed from 30 degrees to 70 degrees or 85 degrees.

After completing the maintenance, the maintenance worker changes the angle of the operation portion 20 from the erected angle β (85 degrees) to the tilted angle α (any angle selected from 30 degrees, 50 degrees, and 70 degrees). The operation of changing the angle of the operation portion 20 from the erected angle β to the tilted angle α is an operation opposite to the operation of changing the angle of the operation portion 20 from the tilted angle α to the erected angle β. Simply put, the maintenance worker pushes down the operation portion 20 toward the rear side so that the operation portion 20 rotates counterclockwise about the rotation shaft portions 31 and the rack portion 41 causes the gear portion 42 to rotate counterclockwise against the load applied by the load portion 43 (see the arrow in the broken line in each of FIG. 16 and FIG. 17). The engagement claws 47 pass beyond the uppermost engagement convex portion 46 while causing the arm portions 48 to bow, and are thus caught on any of the engagement convex portions 46 positioned below. Along with the rotation of the operation portion 20 (the contact point (effort) between the abutting piece 28 and the abutting surface portion 59), the lever 52 pushes up the cover 51 (the support shaft portion 54B (load) fit to the hook portion 58) while rotating counterclockwise using the rotation shaft portions 57 as a fulcrum (for example, see the arrow in the broken line in FIG. 17). In this state, the cover 51 (the body plate 53) is arranged at the closing position P1 at which it covers up the maintenance button 25 (for example, see the arrow in the broken line in each of FIG. 14 and FIG. 15). It is noted that the arrows in the broken lines in FIG. 7 to FIG. 18 each indicate a direction when pushing back the operation portion 20.

In the operation device 15 described above according to the present embodiment, the opening/closing portion 50 covers up the maintenance button 25 (the special input portion) when the operation portion 20 is set at the tilted angle α and exposes the maintenance button 25 when the operation portion 20 is set at the erected angle β. Specifically, when setting the operation portion 20 from the tilted angle α to the erected angle β, the lever 52 causes the cover

51 to slide from the closing position P1 to the opening position P2 while rotating in one direction, and when setting the operation portion 20 from the erected angle β to the tilted angle α, the lever 52 causes the cover 51 to slide from the opening position P2 to the closing position P1 while rotating in the other direction. With this configuration, the operation portion 20 set at the tilted angle α is used by the user during normal use, and thus the maintenance button 25 can be covered up by the cover 51 during normal use. Thus, it is possible to prevent the user from visually seeing or touching the maintenance button 25 and thus suppress erroneous operations such as a user erroneously pressing the maintenance button 25.

In addition, according to the operation device 15 of the present embodiment, by fitting the hook portion 58 of the lever 52 supported by the attachment portion 30 to the support shaft portion 54B of the cover 51 and abutting the abutting surface portion 59 of the lever 52 against the abutting piece 28 of the operation portion 20, the cover 51 can be caused to slide according to the change of the angle of the operation portion 20. Thus, it is possible to simplify the structure and assembling man-hours of the opening/closing portion 50 and reduce production costs of the opening/closing portion 50 as compared to a case where an electric component such as a motor is used for causing the cover 51 to slide.

Further, according to the operation device 15 of the present embodiment, since the first angle retention portion 40 and the second angle retention portion 45 retain the operation portion 20 at any of the tilted angles α and the erected angle β, the user can easily and quickly change the angle of the operation portion 20 to any of the tilted angles α and the erected angle β.

It is noted that in the operation device 15 according to the present embodiment, although the maintenance button 25 is provided near substantially the center of the back surface of the operation portion 20 in the left-right direction, the present disclosure is not limited thereto. The maintenance button 25 may alternatively be provided at a position deviated on either one of the sides of the left-right direction on the back surface of the operation portion 20 (not shown). Alternatively, the maintenance button 25 may be provided on either one of the side surfaces of the operation portion 20 in the left-right direction (not shown). In this case, for example, the cover 51 only needs to be formed substantially in an L shape and arranged so as to cover a part of the back surface and the side surface of the operation portion 20 (not shown). Alternatively, the cover 51 may be formed to cover only the side surface of the operation portion 20 (not shown).

In addition, in the operation device 15 according to the present embodiment, although the tilted angle α of the operation portion 20 with respect to the attachment portion 30 is 30 degrees, 50 degrees, and 70 degrees as an example, the present disclosure is not limited thereto. For the tilted angle α, one or more angles only need to be set within a range of 0 degree or more and smaller than 90 degrees. In other words, an attitude in which the operation portion 20 becomes 0 degree or more and smaller than 90 degrees with respect to the attachment portion 30 may be set as the tilted attitude S1. That is, the operation portion 20 may be set in a recumbent attitude(=tilted attitude S1) that is substantially horizontal (not shown).

Further, in the operation device 15 according to the present embodiment, although the erected angle β of the operation portion 20 with respect to the attachment portion 30 is 85 degrees as an example, the present disclosure is not limited thereto. The erected angle β only needs to be set to an angle that is larger than the tilted angle α and with which the operation portion 20 looks as if it is basically erected. As a specific example, the erected angle β only needs to be set within a range of 80 degrees or more and 100 degrees or less. In other words, the operation portion 20 may be set in an upright attitude(=erected attitude S2) that is substantially vertical (not shown).

Moreover, in the operation device 15 according to the present embodiment, although the angle of the operation portion 20 can be changed among the three tilted angles α (30 degrees, 50 degrees, and 70 degrees) and the one erected angle β (85 degrees), the present disclosure is not limited thereto. The angle of the operation portion 20 only needs to be changed between one or more tilted angles α and one or more erected angles β (not shown). Accordingly, two or more engagement convex portions 46 of the second angle retention portion 45 only need to be provided in accordance with the tilted angle α and the erected angle β (not shown).

Furthermore, in the operation device 15 according to the present embodiment, although the first angle retention portion 40 and the second angle retention portion 45 are provided, the present disclosure is not limited thereto. Either one of the first angle retention portion 40 and the second angle retention portion 45 may be omitted (not shown). For example, when the second angle retention portion 45 is omitted and only the first angle retention portion 40 is provided, the operation portion 20 can be retained at an arbitrary angle.

In addition, in the operation device 15 according to the present embodiment, although the second angle retention portions 45 are provided on both left and right sides of the operation portion 20 and the attachment portion 30, the present disclosure is not limited thereto, and the second angle retention portion 45 may be provided on either one of the sides of the left-right direction of the operation portion 20 and the attachment portion 30 (either of which is not shown). Moreover, in the operation device 15 according to the present embodiment, although the engagement convex portions 46 (the engagement portions) are provided in the attachment portion 30 and the engagement claws 47 (the to-be-engaged portions) are provided in the operation portion 20, the present disclosure is not limited thereto. Conversely, the engagement convex portions 46 may be provided in the operation portion 20, and the engagement claws 47 may be provided in the attachment portion 30 (not shown). Moreover, although an example of the engagement portion is the engagement convex portion 46, the engagement portion may instead be a concave portion into which the engagement claw 47 fits (not shown).

Further, in the operation device 15 according to the present embodiment, although the cover 51 has a shape that is bent substantially in a crank shape, the present disclosure is not limited thereto, and the cover 51 may be formed in, for example, one flat plate shape (not shown). In addition, although the body plate 53, the coupling plate 54, and the bridge plate 55 are formed in plate shapes having substantially the same width, the present disclosure is not limited thereto, and it is also possible to form the body plate 53 in a plate shape having a large width and form the coupling plate 54 and the bridge plate 55 in a plate or stick shape having a smaller width than the body plate 53, for example (not shown). Moreover, although the lever 52 is formed in one flat plate shape, the present disclosure is not limited thereto, and the lever 52 may be formed in a stick shape, for example (not shown). Further, although the abutting surface portion 59 of the lever 52 is merely in contact with the abutting piece 28 of the operation portion 20, the present disclosure is not limited thereto, and the abutting piece 28 may engage with the abutting surface portion 59 while being movable in the longitudinal direction, for example (not shown).

Furthermore, in the operation device 15 according to the present embodiment, although an example of the special input portion is the maintenance button 25 (the push-pull type), the present disclosure is not limited thereto, and a slide switch, a toggle switch, a rocker switch, a DIP switch, a rotary switch, or the like may be used as another example of the special input portion, or a photoelectric sensor, a proximity sensor, a contact-type displacement sensor, a fingerprint sensor, a touch panel, or the like may be used (not shown).

In addition, although the image forming apparatus 1 according to the present embodiment is a so-called multi-function peripheral, the present disclosure is not limited thereto, and a printer, a copying machine, a facsimile, or the like may be used instead. Moreover, although the image forming system of the imaging device 1A is electrophotography, the present disclosure is not limited thereto, and an inkjet system may be used instead.

It is noted that the descriptions on the embodiment described above merely indicate an aspect in the operation device and image forming apparatus according to the present disclosure. The technical scope of the present disclosure is not limited to the embodiment described above and may be variously changed, substituted, or modified without departing from the gist of the technical idea of the present disclosure. The scope of claims include all embodiments that may be included in the range of the technical idea.

It is to be understood that the embodiments herein are illustrative and not restrictive, since the scope of the disclosure is defined by the appended claims rather than by the description preceding them, and all changes that fall within metes and bounds of the claims, or equivalence of such metes and bounds thereof are therefore intended to be embraced by the claims.

The invention claimed is:

1. An operation device operated by a person, comprising:
an operation portion which includes a normal input portion on a front surface thereof and a special input portion on a back surface or side surface thereof;
an attachment portion which supports the operation portion such that an angle of the operation portion can be changed between a tilted angle at which the operation portion is set in a tilted attitude and an erected angle at which the operation portion is set in an erected attitude; and
an opening/closing portion which covers up the special input portion when the operation portion is set at the tilted angle and exposes the special input portion when the operation portion is set at the erected angle, wherein the opening/closing portion includes:
a cover which is supported by the operation portion while being slidable between a closing position at which the special input portion is covered up and an opening position at which the special input portion is exposed; and
a lever which is rotatably supported by the attachment portion at an intermediate portion thereof in a longitudinal direction and has one end portion in the longitudinal direction movably engaged with the cover and another end portion in the longitudinal direction movably engaged with the operation portion,
when the operation portion is set from the tilted angle to the erected angle, the lever causes the cover to slide from the closing position to the opening position while rotating in one direction, and
when the operation portion is set from the erected angle to the tilted angle, the lever causes the cover to slide from the opening position to the closing position while rotating in another direction.

2. An image forming apparatus, comprising:
the operation device according to claim 1; and
an imaging device which forms an image on a sheet.

3. The operation device according to claim 1, wherein the lever includes:
a lever body portion which extends in the longitudinal direction;
a pair of rotation shaft portions which respectively protrude outwardly from both side portions of an intermediate portion of the lever body portion in the longitudinal direction and rotatably fit into a pair of rotation support portions provided in the attachment portion;
a hook portion which is provided at one end portion of the lever body portion in the longitudinal direction and rotatably fits into a support shaft portion provided in the cover; and
an abutting surface portion which is formed at another end portion of the lever body portion in the longitudinal direction and is abutted against an abutting piece provided in the operation portion.

4. The operation device according to claim 1, further comprising:
a first angle retention portion which retains the operation portion at an arbitrary angle including the tilted angle and the erected angle,
wherein the first angle retention portion includes:
a rack portion which is provided in the operation portion and includes a plurality of teeth arranged in a circular arc shape;
a gear portion which is rotatably supported by the attachment portion and intermeshes with the rack portion; and
a load portion which applies a load to a rotation of the gear portion and retains the gear portion at an arbitrary angle.

5. The operation device according to claim 1, further comprising:
a second angle retention portion which retains the operation portion at an angle selected from the tilted angle and the erected angle,
wherein the second angle retention portion includes:
at least two engagement portions provided in either one of the operation portion and the attachment portion in accordance with the tilted angle and the erected angle; and
a to-be-engaged portion which is provided in another one of the operation portion and the attachment portion and engages with one of the engagement portions selected from a plurality of the engagement portions.

* * * * *